(12) United States Patent
Hunziker et al.

(10) Patent No.: US 10,399,162 B2
(45) Date of Patent: Sep. 3, 2019

(54) GEAR PROCESSING MACHINE HAVING A BELLOWS

(71) Applicant: GLEASON SWITZERLAND AG, Studen (CH)

(72) Inventors: Raphaël Hunziker, Rothrist (CH); Severin Lang, Aefligen (CH); Christoph Flury, Leuzigen (CH)

(73) Assignee: GLEASON SWITZERLAND AG, Studen (CH)

( * ) Notice: Subject to any disclaimer, the term of this patent is extended or adjusted under 35 U.S.C. 154(b) by 0 days.

(21) Appl. No.: 15/765,418

(22) PCT Filed: Oct. 1, 2015

(86) PCT No.: PCT/CH2015/000147
§ 371 (c)(1),
(2) Date: Apr. 2, 2018

(87) PCT Pub. No.: WO2017/054096
PCT Pub. Date: Apr. 6, 2017

(65) Prior Publication Data
US 2018/0304388 A1 Oct. 25, 2018

(51) Int. Cl.
*B23Q 11/08* (2006.01)
*B23F 19/05* (2006.01)
*B23F 23/12* (2006.01)
*B23Q 39/00* (2006.01)

(52) U.S. Cl.
CPC .............. *B23F 19/05* (2013.01); *B23F 23/12* (2013.01); *B23Q 11/0816* (2013.01); *B23Q 39/00* (2013.01)

(58) Field of Classification Search
CPC .......... B23F 19/05; B23F 19/057; B23F 5/02; B23F 5/163; B23F 5/16
See application file for complete search history.

(56) References Cited

U.S. PATENT DOCUMENTS

| 1,190,391 A | * | 7/1916 | Fellows | ..................... B23F 5/16 |
| | | | | 409/34 |
| 2,105,896 A | * | 1/1938 | Stubbs | ..................... B23F 19/05 |
| | | | | 451/114 |

(Continued)

FOREIGN PATENT DOCUMENTS

| CH | 686937 A5 * | 8/1996 | ............ B23F 19/057 |
| DE | 91 13 368.8 U1 | 1/1992 | |

(Continued)

*Primary Examiner* — Nicole N Ramos
(74) *Attorney, Agent, or Firm* — Birch, Stewart, Kolasch & Birch, LLP

(57) ABSTRACT

The invention relates to a toothing processing machine comprising a machine frame and a spindle carrier having a first spindle. The spindle comprises a first spindle housing and a first spindle shaft, which is arranged in the first spindle housing such that it can rotate about a first spindle axis, and a free end for receiving a work piece or a tool. A second spindle is also provided having a second spindle housing and a second spindle shaft for receiving a tool or work piece, wherein the second spindle shaft is mounted in the second spindle housing such that it can rotate about a second spindle axis. In addition, at least one wall of the machine frame forms a part of the casing of a closable working chamber, in which the work piece can be processed and which can be closed in order to prevent the release of a material removal, a processing liquid and/or a processing mist from the working chamber into other machine regions or to the outside. The spindle carrier is also arranged on the machine frame such that it can move in the direction of the first spindle axis. In addition, the closable working chamber includes the free end of the first spindle shaft and at least sections of the second spindle shaft. According to the invention, the toothing processing machine comprises a bellows, securely connected to the spindle carrier on a first side and to the at least one wall of the machine frame on a (Continued)

second side, wherein the bellows borders the closable working chamber at at least one point in such a way that a part of the spindle carrier is permanently positioned outside of the working chamber. In this way, the bellows is able to commence a relative movement in the direction of the first spindle axis between the spindle carrier and the machine frame, via a moving apart and together.

22 Claims, 6 Drawing Sheets

(56) References Cited

U.S. PATENT DOCUMENTS

| | | | |
|---|---|---|---|
| 3,824,890 | A | 7/1974 | Zettler et al. |
| 4,528,779 | A | 7/1985 | Wiener |
| 5,347,760 | A * | 9/1994 | Miyauch .............. B23F 19/057 451/114 |
| 7,975,356 | B2 * | 7/2011 | Schafer .............. B24B 13/0031 29/38 A |
| 2014/0199924 | A1 | 7/2014 | Jaeger |
| 2016/0184910 | A1 | 6/2016 | Brandsberg et al. |

FOREIGN PATENT DOCUMENTS

| | | | | |
|---|---|---|---|---|
| DE | 9409049 U1 * | 9/1994 | ............ | B23F 19/057 |
| DE | 102005005993 A1 * | 8/2006 | ............ | B23F 19/057 |
| DE | 102010024366 A1 * | 12/2011 | ............ | B23F 19/05 |
| DE | 10 2011 082 869 B4 | 11/2013 | | |
| EP | 1319458 A1 * | 6/2003 | ............ | B23F 19/057 |
| WO | 2015/021566 A1 | 2/2015 | | |

* cited by examiner

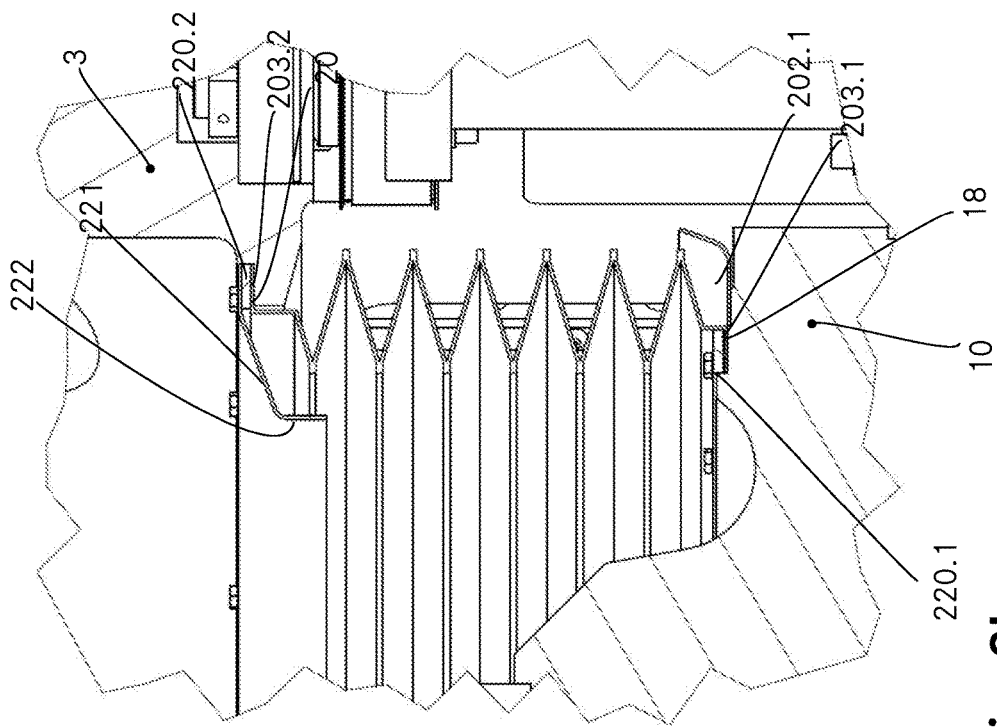
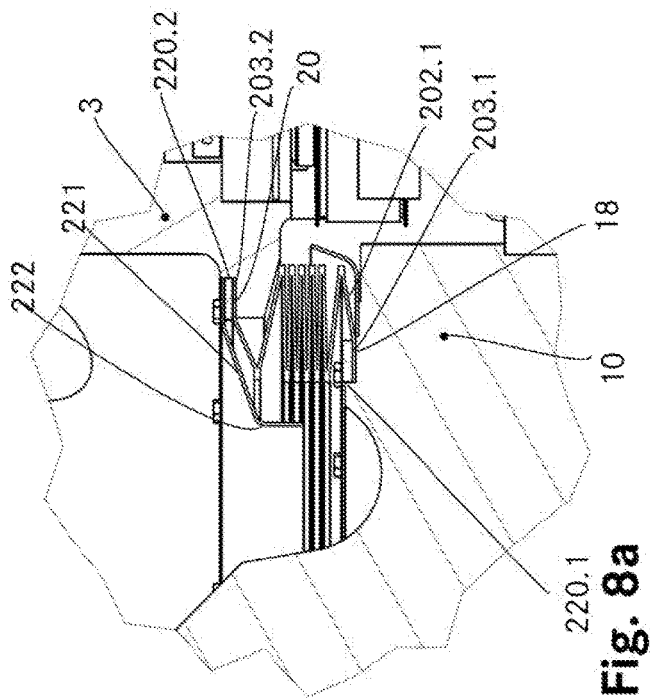

GEAR PROCESSING MACHINE HAVING A BELLOWS

TECHNICAL FIELD

The invention relates to a gear processing machine, in particular a gear hard finishing machine. It comprises a machine frame and a spindle slide having a first spindle. The spindle comprises a first spindle housing and a first spindle shaft. The first spindle shaft is in this case arranged in the first spindle housing so as to be rotatable about a first spindle axis and has a free end for receiving a workpiece or a tool. The machine also comprises a second spindle with a second spindle housing and a second spindle shaft, wherein the second spindle shaft for receiving a tool or workpiece is arranged in the second spindle housing so as to be rotatable about a second spindle axis. In this case, at least one wall of the machine frame forms a part of the shell of a closable working space in which the workpiece is able to be machined and which can be closed off in order to prevent any removed material, machining liquid and/or machining mist from escaping from the working space into other machine regions or to the outside. In this case, the spindle slide is arranged on the machine frame so as to be displaceable in the direction of the first spindle axis. In addition, the closable working space encloses the free end of the first spindle shaft and at least partially encloses the second spindle shaft.

PRIOR ART

Gear processing machines of this kind are known. They are used primarily for the subtractive machining of pre-toothed precision gears for transmissions of all kinds, but in particular for vehicle transmissions. In most subtractive machining methods, in order to support the machining process, an oil- or water-based machining liquid is required. The removed workpiece material and tool abrasion that arise during machining are mixed with the machining liquid to form a machining sludge which can be deposited on machine parts. In addition, in gear processing machines which work with dressable tools, removed tool material arises during the dressing of the dressable tool, said removed tool material comprising a proportionately large amount of abrasive particles plus the abrasion of the dressing tool as a result of the latter being worn down. Both the removed tool material and the abrasion of the dressing tool are likewise mixed with the machining sludge. In many cases, in particular in high-speed processes, in which the machining liquid is sprayed into the machining region under high pressure, machining mist arises. The machining liquid, the machining mist and thus the machining sludge spread throughout the machine housing as a result. Therefore, not only do the individual machine components have to be sealed off in a sometimes elaborate manner, but also a great deal of effort has to be made to ensure that the liquid that has been deposited on workpieces and machine components does not pass out of the machine when parts are exchanged. In addition, large and powerful suction plants for extracting the machining mist are required. In this case, it is particularly difficult to seal off the working space between the moving parts of the machine and the machine frame.

WO 2015/021566 A1 (MDC Max Daetwyler AG) shows a gear honing machine having a first workpiece spindle, which is displaceable vertically, with a free end upward and along its spindle axis, and a second tool spindle, both spindles being arranged on a cylindrical machine frame and being surrounded thereby in the manner of a casing. The machine frame, which is closed off at the top and bottom, in this case forms a shell which surrounds the working space and prevents lubricants and chips from escaping. In this case, a steel plate is fastened in the casing, in the lower region of the machine above a bottom, in order to pick up lubricants and chips. The machine allows easy closing off of the machine with respect to the escape of lubricants and chips, but lubricants and chips can still pass into the lower region of the machine and especially soil the feed axis of the workpiece spindle.

DE 10 2011 082 869 B4 (Felsomat) shows a further machine for honing gears. The machine is equipped with a closed working tank which completely surrounds a tool spindle and has, on the top side, a cover with a cutout. Through this cover, a workpiece spindle is introducible, the spindle neck of which is surrounded in an oil-tight manner by the cutout during introduction. Since the cover is also mounted so as to be displaceable radially to the workpiece spindle in an oil-tight manner, the cover is carried along during infeed movements of the workpiece spindle. As a result of this arrangement, the spreading of oil mist is limited to the small region of the working tank. Only the front end of the workpiece spindle is exposed to the machining liquid, but not the rear part having the measurement systems and the cable connections. Likewise, all of the feed axes of the machine are shielded from the oil mist.

This arrangement is only suitable for machines in which the workpiece spindle is arranged directly above the cutout. As a result of the arrangement of the workpiece spindle above the working space, the machine becomes complex. The shaft seal of the cover is exposed to continuous wear as a result of the vertical sliding movement, this wear impairing the tightness of the rubber lips over time. In particular, relatively long service lives result in the formation of bead-like depositions of machining sludge. The abrasive particles of these depositions cause a large amount of degeneration of the rubber lips or even the destruction thereof when manufacturing is resumed.

The known machines mostly have a complicated structure or are otherwise relatively difficult to service and expensive to maintain.

SUMMARY OF THE INVENTION

The object of the invention is to create a machine which belongs to the technical field mentioned at the beginning and which, while having a space-saving and cost-effective structure, is easy to service and cost-effective to maintain.

The object is achieved as defined by the features of claim 1. According to the invention, the gear processing machine comprises a bellows which is firmly connected to the spindle slide on a first side and which is firmly connected to the at least one wall of the machine frame on a second side, wherein the bellows delimits the closable working space at at least one location such that a part of the spindle slide is located permanently outside the working space. In this case, the bellows is capable, by expanding and contracting, of taking up any relative movement in the direction of the first spindle axis between the spindle slide and the machine frame.

The bellows allows inexpensive sealing off of the working space between the machine frame and the spindle slide, said sealing being reliably and simultaneously tight. In this case, this sealing system is very robust, since it does not comprise any interfaces that are moved with respect to one another, have a sealing-off function and are subject to wear and are thus susceptible to depositions. As a result of the closing off of the working space between the spindle slide and the machine frame, it is possible to keep that part of the machine that is exposed to soiling very small. In particular, driving means intended for the spindle slides and also any connections and measurement systems of a drive for the first spindle shaft can be arranged outside the working space and thus be protected from machining liquid and machining mist. As a result, no special sealing-off measures for the feed axes, the guides of the feed axes or for any measurement systems located on the rear side of the first spindle shaft are required, since these can be fitted outside the working space. In addition, a possible suction plant for the machining mist can be dimensioned in a smaller manner, since, on account of a smaller spatial volume that is exposed to the machining mist, a reduced suction power is necessary.

In the scope of this application, the outer contours of components firmly connected to the machine frame, for example cover plates and other types of machine cladding, are also defined as walls of the machine frame.

Preferably, the spindle housing and the first spindle shaft are installed in a mechanical unit which can be fastened to an interface of the spindle slide. However, the spindle shaft can be mounted directly in the spindle slide and thus the spindle housing can be an integral constituent of the spindle slide.

In the scope of this invention, a spindle is also understood to be a position-controlled axis of rotation (C axis). In the scope of this invention, the term gear processing machine is also intended to cover machines which, in addition to other machining processes, are capable of carrying out a gear processing process, i.e. including what are known as Combi machines.

The term removed material is understood to be the material removed from the workpiece during machining, for example in the form of chips, the material removed from the tool by wear or the material removed from the tool during a dressing process, and the wear to a dressing tool.

Gear hard finishing machines include gear processing machines which allow the machining of hardened or quenched and tempered gear surfaces via a hard finishing method, for example grinding, honing and hard skiving.

Preferably, the bellows is a folding bellows. The use of a folding bellows makes it possible to take up a large relative movement between the first spindle axis and the machine frame and thus to keep the restoring forces small. Depending on the travel and space conditions, however, it may also be advantageous to use a simple bellows which has a more simple structure and is more cost-effective to produce.

Advantageously, the bellows has a first opening on the first side and a second opening on the second side and a circumferentially closed lateral surface in between. In this case, the bellows is connected to the spindle slide in the region of a contour of the first opening and to at least one wall of the machine frame in the region of a contour of the second opening. In this case, the two contours each surround the first spindle axis.

This arrangement allows particularly favorable and reliable sealing off between the wall of the machine frame and the spindle housing.

In an alternative embodiment, the bellows covers only a part of a circumference of the spindle slide about the first spindle axis. This may be advantageous for example when there is less space between the spindle slide and the machine frame in the region of an outer face of the spindle slide and not enough installation space is available. In this region, it is possible, for example for sealing off between the spindle slide and a further wall of the machine frame, for a different sealing system, for example a sealing lip or a lamellar seal, to be fitted and thus to supplement the seal in the region of the circumference which is not covered by the bellows.

A lateral surface should also be considered to be closed when the bellows has a seam around the circumference, said seam closing the folding bellows via the circumference. The seam can in this case be closed in a wide variety of ways, for example by a permanent connection such as welding, adhesive bonding, riveting, or by a releasable connection such as screwing, clamping or a combination, for example in the form of a ring nut connection.

Preferably, the first spindle axis is oriented substantially vertically and the free end of the first spindle shaft is directed upward. This embodiment allows a particularly compact and rigid construction of the machine. This construction makes it possible especially to realize rigid mounting of the first spindle shaft, since the size of the spindle and the weight in its position in the lower region play less of a role. In addition, the machine frame can be designed to be more stable in the lower region, in which the first spindle with its first spindle housing is arranged, than in an upper region of the machine frame. The rigidity of the spindle shafts and the mountings thereof are extremely important for the workpiece spindle or tool spindle of a gear processing machine, since, as a result, greater machining speeds can be achieved. In addition, the vertical arrangement of the first spindle with the free end of the spindle shaft upward allows easy loading and unloading of the machine with workpieces or tools from above, for example via a gantry loader.

Alternatively, however, the first spindle can also be arranged at the top, such that the free end of the first spindle is directed downward. Loading and unloading then take place for example from the side or from below. The first spindle can also be arranged horizontally on a horizontal slide, however, and likewise be loaded and unloaded from above. However, an additional pivot axis is then required in many cases for loading and unloading. Variants are also possible, however, in which the first spindle is arranged in an inclined manner, in particular in the case of inclined-bed machines.

Preferably, the working space is closable tightly with respect to the escape of machining liquid or machining mist. It is thus possible, in the closed-off state, for no machining liquid to leave the closed-off machining space along a direct path, apart from through drainage channels or extraction devices provided for this purpose. In particular, it is presumed that the working space is also tight with respect to low-viscosity machining liquids, as are used as cooling lubricant in precision machining methods.

This requires the bellows to seal off the region between the wall of the machine frame and the spindle slide with respect to an escape of machining liquid and machining mist. Therefore, the seal acts not just as a splash guard but also for sealing off. This demands that both the face forming the bellows and the regions between the bellows and the first spindle housing and between the bellows and the at least one machine wall be tight. In the case of a bellows with a closed lateral surface, the lateral surface of the bellows and the region of the contour of the first opening, in which the bellows is connected to the spindle slide, and the region of the contour of the second opening, in which the bellows is connected to the at least one wall of the machine frame, therefore have to be tight.

As a result, additional sealing off of the machine elements outside the working space can be avoided.

In some cases, however, it may be sufficient for the bellows not to be 100% tight with respect to the machining liquid but to serve primarily as a splash guard. This is the case in particular when the first spindle is oriented with the free end downward and/or when no machining mist occurs. In such a case, it is possible in particular for partial permeability of the bellows at the interfaces to be tolerable. If appropriate, it is also possible for an additional drip tray to be provided in the regions between the bellows and the first spindle housing or the bellows and the at least one wall of the machine frame.

In a further particular embodiment, the second spindle shaft is configured as a hollow shaft for receiving an annular tool or an annular workpiece. Such a spindle shaft is particularly suitable for gear honing machines for receiving internally toothed honing rings or internally toothed workpieces. It makes it possible to load and unload the workpiece or tool on the free end of the first spindle through the hollow shaft of the second spindle shaft and through the annular tool or workpiece, for which reason the axes of the machine, but in particular the second spindle for changing the workpiece or tool, have to be moved only to an insignificant extent. This is not only advantageous for the workpiece or tool changing time but also makes it possible to design the axes for short strokes, with the result that the machine can be constructed in a more compact, more rigid and more cost-effective manner. In this case, a hollow shaft should be understood as being a spindle shaft which, in the mounted state, i.e. including clamping means, has a continuous opening along its axis of rotation.

In a particular embodiment, the spindle shaft is embodied in a cup-shaped manner. The second spindle shaft then has, at one end, a larger inside diameter for receiving an annular tool or an annular workpiece. At the other end, the spindle shaft can either be closed or be formed in a hollow-cylindrical manner but with a smaller diameter. This construction makes it possible to use smaller bearing diameters and motors with smaller air gaps, with the result that spindles with higher rotational speeds can be realized, which are advantageous in particular for internal honing, in which an internally toothed workpiece is clamped in place in the second spindle shaft.

In an alternative embodiment, the second spindle comprises a free end for clamping a tool or a workpiece, however. At the free end, a clamping means for fixing the workpiece to the spindle shaft is then preferably attached. This embodiment is advantageous in particular for gear processing machines which work with externally toothed tools, for example honing machines with externally profiled tools, shaving machines and generation grinding machines.

Particularly preferably, the gear processing machine is a gear honing machine. For honing external toothings, the workpiece to be machined can be clamped in place on the free end of the first spindle and a toothed honing tool (abrasive tool) can be clamped in place on the second spindle shaft. Particular preference is given to a honing machine in which an internally toothed (abrasive) honing tool can be clamped in place on the second spindle shaft. For honing internal toothings, the workpiece to be machined can be clamped in place on the second spindle shaft and, in turn, the (externally profiled) honing tool (abrasive gear) can be clamped in place on the first spindle shaft.

Alternatively, however, the gear processing machine can also be some other gear processing machine which is capable of machining pre-toothed workpieces or comprises at least one working step in which a toothing of a pre-teethed workpiece is machined. Examples of such gear processing machines that may be mentioned are gear grinding machines, both generation grinding machines and profile grinding machines, soft and hard shaving machines, gear deburring machines and hard peeling machines.

Advantageously, the second spindle housing is mounted on the machine frame in a manner perpendicular to the first and to the second spindle axis so as to be pivotable about a pivot axis, preferably at two diametrically opposite bearing locations.

Since the second spindle is mounted on the machine frame in a pivotable manner, very high rigidity can be achieved. This is the case in particular in an arrangement with two diametrically opposite bearing locations. Acceleration forces of the second spindle that occur or reaction forces from the machining process can be dissipated directly to the machine frame. However, it is also possible for the second spindle to be mounted on a different axis which is arranged kinematically between the machine frame and the second spindle. As a result, additional degrees of freedom of movement can be realized.

In another preferred embodiment, the second spindle housing is additionally mounted on the machine frame so as to be displaceable along a linear axis which coincides with the pivot axis. The mounting consequently allows a linear movement along the pivot axis and a pivoting movement about the pivot axis. As a result of this mounting with two degrees of freedom, particularly compact and rigid mounting of the second spindle housing is possible. In particular, there are fewer components. It is also easier to position the drive units of the pivot axis and linear axis outside the working space and to configure the working space in a more compact manner. This mounting is preferably embodied as a plain bearing. However, it is also possible to use rolling bearings, for example ball cages, or hydrostatic bearings for such mounting.

Advantageously, the closable working space entirely encloses the second spindle shaft. As a result, sealing off of the working space is simplified further, in particular when the second spindle housing is also arranged substantially inside the working space. The term "substantially" is understood to mean that extensions of the second spindle housing for connecting the second spindle to other axes or to bearing locations with other axes or to the machine frame can be located at least partially outside the closable working space.

It is preferred for the lateral surface of the bellows to have a circular cross section and preferably a cylindrical basic shape. Advantageously, the wall of the machine frame, to which the bellows is connected, and the spindle housing, in the region in which the bellows is fastened, also have a circular shape. A bellows with a circular cross section can be manufactured particularly easily and is particularly durable.

Preferably, the bellows is produced from an elastomer, in particular from rubber. This allows particularly simple sealing off between the at least one wall of the machine frame and the bellows, or, respectively, between the first spindle housing and the bellows. The bellows is also very easy and cost-effective to produce. Since it is able to be realized in one piece, it is also very robust and durable. A particularly readily suitable elastomer for the bellows is acrylonitrile butadiene rubber (NBR), which is distinguished by particular swelling resistance with respect to mineral oils, good elasticity and high compression set resistance. Depending on the nature of the machining liquid, it is also possible for elastomers made of natural rubber or other synthetic rubber types such as acrylate rubber (ACM) to be used to produce the bellows.

However, instead of elastomers, it is also possible to use other materials which are elastically deformable. For example, it is possible to use metal bellows which are welded together from individual metal lamellae.

Preferably, the space surrounded by the bellows belongs to the working space. As a result, the bellows has its smallest expansion in the position in which the first spindle reaches furthest into the working space. Since, typically, the working position is in the vicinity of the position in which the first spindle projects furthest into the working space and in which it is located for a relatively large proportion of time, the proportion of time in which the bellows has its greatest expansion is reduced. Furthermore, the volume of the working space is reduced even further as a result of this arrangement.

Alternatively, the working space is located outside the space surrounded by the bellows, such that the bellows separates a region between the machine frame and the spindle housing from the working space and the working space is reduced by the bellows. In this case, the expansion of the bellows is greatest when the first spindle projects furthest into the working space.

In a preferred embodiment, the spindle slide comprises an annular flange which is connected to the bellows in a liquid-tight manner via a circumference in the region of the first opening. As a result of the flange, particularly simple coupling of the bellows to the spindle slide is allowed. The annular flange is in this case preferably integrated into the spindle slide. A cast spindle slide, made for example of gray cast iron, cast steel or mineral casting, is very particularly suitable for integration of the annular flange, since scarcely any extra costs are incurred during manufacturing as a result. The flange advantageously has, for connecting to the bellows, a flat surface that is oriented perpendicularly to the first spindle axis.

Likewise, the wall of the machine frame preferably has an annular flange face which is connected to the bellows via a circumference in the region of the contour of the second opening.

In this case, the flange face is oriented preferably toward the side which faces away from the second opening of the bellows. This arrangement is advantageous when the free end of the first spindle is oriented upward, since the bellows then covers a possible connecting gap between the flange face and the bellows, such that an additional splash guard preventing the escape of machining liquid is ensured.

In this case, the flange preferably defines an annular well with at least one drain opening, through which the machining liquid with the removed material can run out of the working space. The machining liquid with the removed material can collect in the well and run out. The well is preferably embodied such that it has a channel which leads toward the drain opening with a negative gradient, such that the machining liquid with the removed material cannot collect at any point and flows into the drain opening.

In particular, the machine frame is configured such that the working space is closeable at the top by a cover for operation of the machine. As a result, the gear processing machine is particularly readily suitable for loading and unloading from above, both manually and in an automated manner. Compared with a lateral door, a cover is also easier to realize mechanically, since it does not have to have a static function.

Advantageously, the spindle slide is coupled to a ball screw, wherein the ball screw is supported on the machine frame. This results in a particularly precise and simple drive possibility for the first spindle in the direction of its spindle axis. Coupling to a ball screw which is supported on the machine frame allows a very rigid drive. Since the travels are generally very small as a result of the bellows, it is also possible for a short ball screw to be used. Particularly preferably, the spindle nut of the ball screw is arranged on the spindle slide.

Alternatively, however, it is also possible for other drives to be used to generate the vertical movement, for example a direct drive (linear motor), a belt drive or a rack and pinion drive.

Preferably, the bellows is designed such that it is capable of permanently taking up pendulum stroke movements in the range of up to about +/−10 mm, preferably up to about +/−5 mm, about a working position during machining, wherein the working position is at most 50 mm away from a neutral position of the bellows. However, in order to change a workpiece, the bellows can be extended between 0-300 mm into a changing position, preferably between 0-200 mm, from the neutral position.

The neutral position is understood to be that position of the first spindle in the direction of the spindle axis with respect to the machine frame in which the bellows does not exert any restoring forces and is not loaded in the new state.

Since operation takes place substantially in the vicinity of a neutral region, the bellows can be operated with low wear and thus a long service life can be achieved. At the same time, however, a large expansion or contraction for changing a workpiece or tool is also possible.

Particularly preferably, the spindles are motor spindles. Motor spindles are particularly suitable for use in gear processing machines. Motor spindles allow very precise machining with at the same time a high rotational speed as a result of the direct coupling between the drive and spindle shaft. As a result of the use of precise and high-resolution angle measurement systems in conjunction with a torsionally rigid spindle shaft, very high quality of synchronization with high control stiffness can be achieved both in speed-controlled operation and in position-controlled operation. However, it is alternatively also possible to use spindles with an indirect drive. These have the advantage that the development of heat by the motor does not act directly on the spindle shaft and/or the spindle housing.

Further advantageous embodiments and combinations of features of the invention emerge from the following detailed description and the entirety of the claims.

BRIEF DESCRIPTION OF THE DRAWINGS

In the drawings used to explain the exemplary embodiment:

FIG. 8a shows an enlarged view of a detail of FIG. 6, which shows the installation situation of the folding bellows in the machine in the working position; and FIG. 8b shows an enlarged view of a detail of FIG. 6, which shows the installation situation of the folding bellows in the machine in the state of maximum expansion.

In principle, identical parts are provided with identical reference signs in the figures.

WAYS OF CARRYING OUT THE INVENTION

An exemplary embodiment of a gear processing machine according to the invention is illustrated in the form of a gear honing machine in FIGS. 1-8. In the following text, the gear honing machine is referred to as honing machine.

Figure 1:
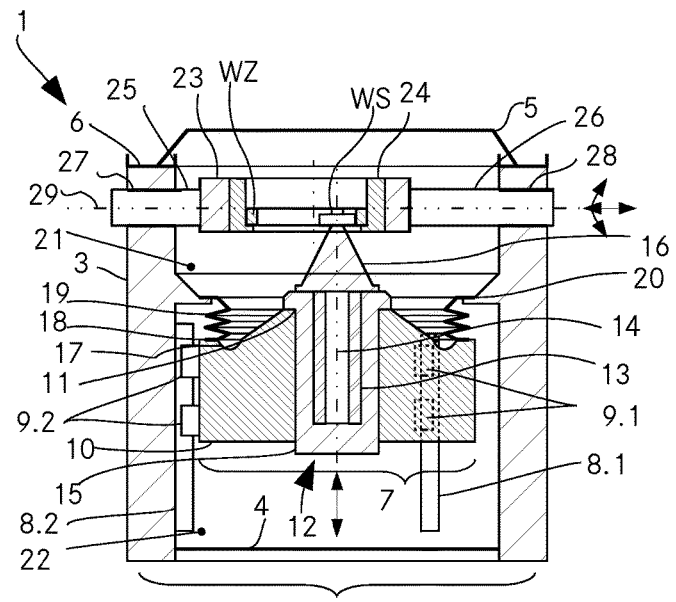
FIG. 1 shows a schematic diagram of an embodiment according to the invention of the gear processing machine according to the invention in the form of a sectional illustration that is not true to scale.

FIG. 1 shows a schematic diagram of the honing machine 1 according to the invention in the form of a sectional illustration that is not true to scale. The honing machine 1 comprises a machine frame 2 with a machine bed 3 made of vertical walls which form a closed casing around a periphery. The machine frame 2 also comprises a base plate 4 which downwardly delimits the space surrounded by the casing, and a manually operable machine hood 5 which, in the closed state, upwardly delimits the space surrounded by the casing and is also referred to as cover in the scope of this application. Fitted between the machine hood 5 and machine bed 3 is a drip tray 6 which feeds the oil that collects during the loading and unloading of workpieces and tools, or which accumulates on the underside of the machining hood during honing, to a honing oil treatment.

In the machine frame 2, or in the machine bed 3, a spindle slide 7 is mounted in a vertically movable manner via three rolling guides, which each comprise a guide rail 8.1, 8.2 and each comprise a carriage 9.1, 9.2 with in each case two roller carriages. The guide rails 8.1, 8.2 are fitted on the machine bed 3 such that they each enclose an angle of about 120° with one another. In FIG. 1, only two of the three rolling guides are visible on account of the sectional illustration.

The spindle slide 7 also comprises a spindle carrier 10 on which the three carriages 9.1, 9.2, 9.3 are fitted on three fastening faces 49.1, 49.2, 49.3 (see FIG. 4) that face outward in a horizontal direction. The faces are each arranged at an angle of 120° to one another and adjoin, with their centers, the corners of an imaginary isosceles triangle, such that the workpiece spindle 12 fastened in a central circular opening 11 in the spindle carrier 10 is located approximately at the centroid of the imaginary triangle. The spindle shaft 13 of the workpiece spindle 12 is mounted in the workpiece spindle housing 15 so as to be rotatable about the workpiece spindle axis 14. The free end of the spindle comprises a clamping means 16 for fastening the workpiece WS with the toothing to be machined. Concentrically around the opening 11, or with the workpiece spindle axis 14, the spindle carrier 10 drops conically toward the outside on its vertically upwardly facing side. This portion, which has the shape of a hollow truncated cone, is adjoined by a drainage channel 17 which surrounds the base of the truncated cone. Arranged in a manner adjoining the drainage channel 17, at the outside diameter of the spindle carrier 10, is an outer flange 18 for connecting the spindle slide 7 to the lower end of a folding bellows 19.

Furthermore, the casing of the machine bed 3 has on the inner side a protrusion on which an inner flange 20 is arranged, which, like the outer flange 18, likewise extends concentrically with the spindle axis 14 and which serves to fasten the upper end of the folding bellows 19 to the machine bed 3, or to the machine frame 2.

The machine frame 2, or the machine bed 3, the spindle slide 7 with the spindle carrier 10 and the workpiece spindle 12, the folding bellows 19 and the machine hood 5 delimit the working space 21, in which the workpiece is machined, in an oil-tight manner. At the same time, the folding bellows 19 together with the spindle slide 7 delimits the machine space 22, in the lower part of the machine bed 3, from the working space 21. This space is, like the space outside the machine casing, sealed off from the working space 21 and free of honing oil and removed material or chips. It is downwardly delimited by the base plate 4.

All of the drive devices and guides located around the machine space are consequently in a clean environment and do not need to be additionally sealed off, for which reasons components of a lower protection class can be used. The drive of the spindle slide 7 is not illustrated in FIG. 1 and is described further below.

Arranged within the working space 21 is the honing ring carrier 23, in which the internally toothed honing tool WZ is mounted so as to be rotatable in a manner clamped in place in a hollow shaft 24. The honing ring carrier 23 has a toroidal shape, and an electric direct drive drives the hollow shaft 24 therein. Two steel tubes 25, 26 are fastened diametrically oppositely to the outer casing of the honing ring carrier 23. The steel tubes 25, 26 extend outward on both sides through corresponding openings with plain bushings 27, 28 in the machine bed 3. The diameters of the steel tubes 25, 26 are coordinated such that they interact with the plain bushings 27, 28 in a precisely fitting manner. The mounting is embodied such that the steel tubes 25, 26 and thus the honing ring carrier 23 can be rotated and displaced with respect to the machine frame 2 along the longitudinal axis 29 defined by the plain bearings. Via this longitudinal axis 29, the honing tool WZ can be infed in a radial direction toward the workpiece WS and the crossed axes angle between the workpiece WS and the tool WZ can be set. The longitudinal axis is consequently at the same time an infeed and pivot axis.

Figure 2A:
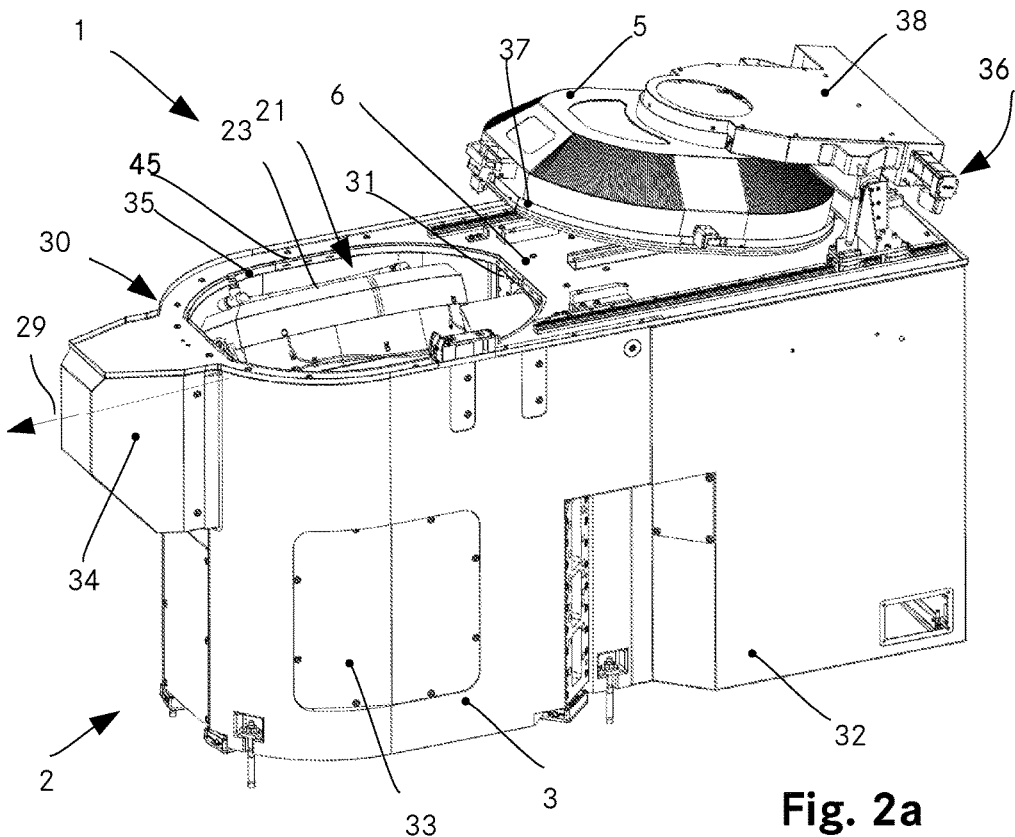
FIG. 2a shows an oblique view of the machine with complete cladding and the machine hood open.
Figure 2B:
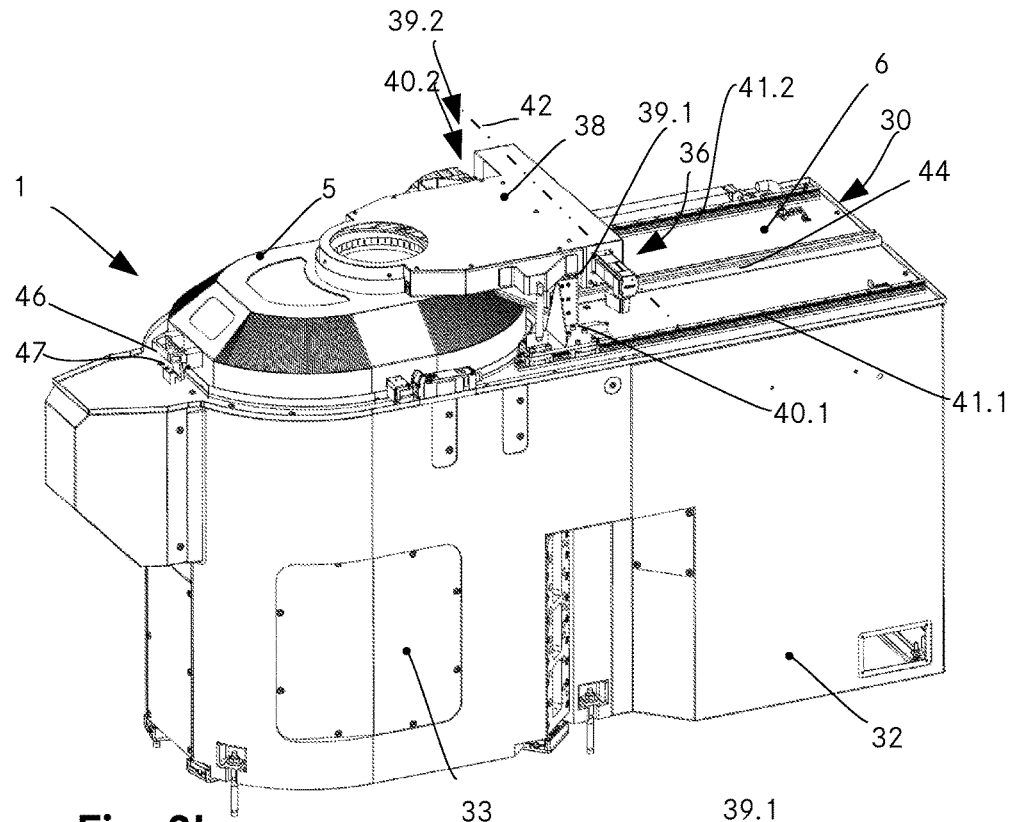
FIG. 2b shows an oblique view of the machine with complete cladding and the machine hood closed.
Figure 2C:
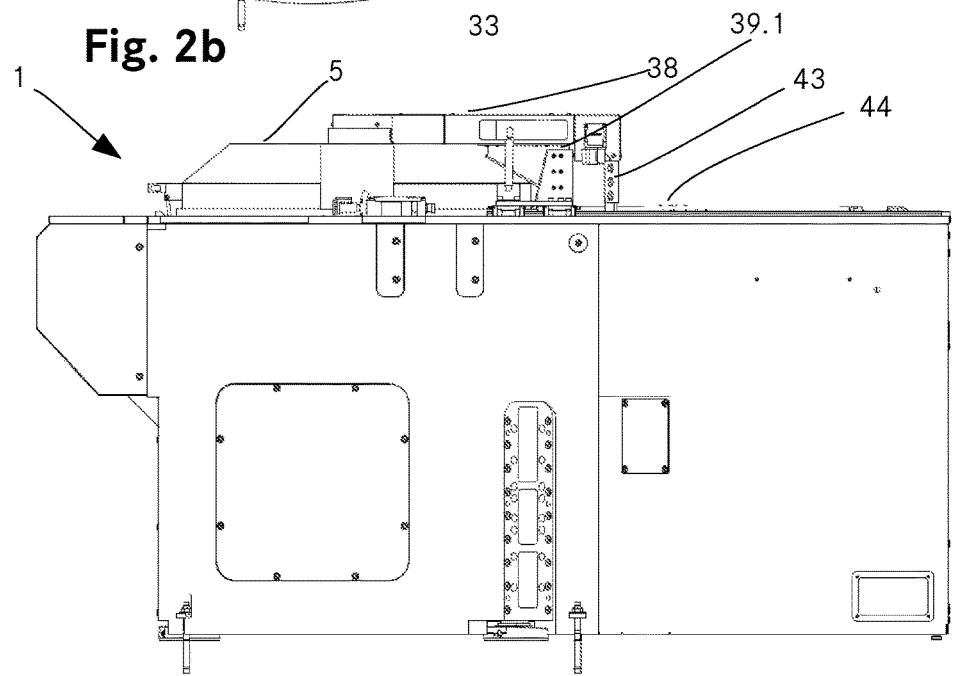
FIG. 2c shows a side view of the machine with complete cladding and the machine hood closed.

FIGS. 2a to 2c show views of the honing machine 1 according to the invention with a completely clad machine frame 2. FIG. 2a shows an oblique view of the honing machine with the machine hood 5 open. FIG. 2b shows an oblique view and FIG. 2c shows a side view of the completely clad honing machine with the machine hood 5 closed.

In addition to the machine bed 3, the machine frame 2 has a machine cladding and a machine top part 30 into which a drip tray 6 is integrated.

The honing machine 1 has a largely mirror-symmetrical structure, wherein the plane of symmetry is formed by the vertical plane in which the longitudinal axis, or pivot axis, 29 of the honing ring carrier 23 lies (see also FIG. 1).

The casing of the machine bed 3 is formed from vertically oriented wall elements of identical height which stand on a substantially rectangular base. It should be noted that the wall elements can be composed of individual components that are arranged one above another or alongside one another.

The wall elements of the machine bed 3 are preferably made of gray cast iron. However, they could also be composed, at least in part, of mineral casting, cast steel, polymer concrete or granite, or of a combination of different materials.

Figure 4:
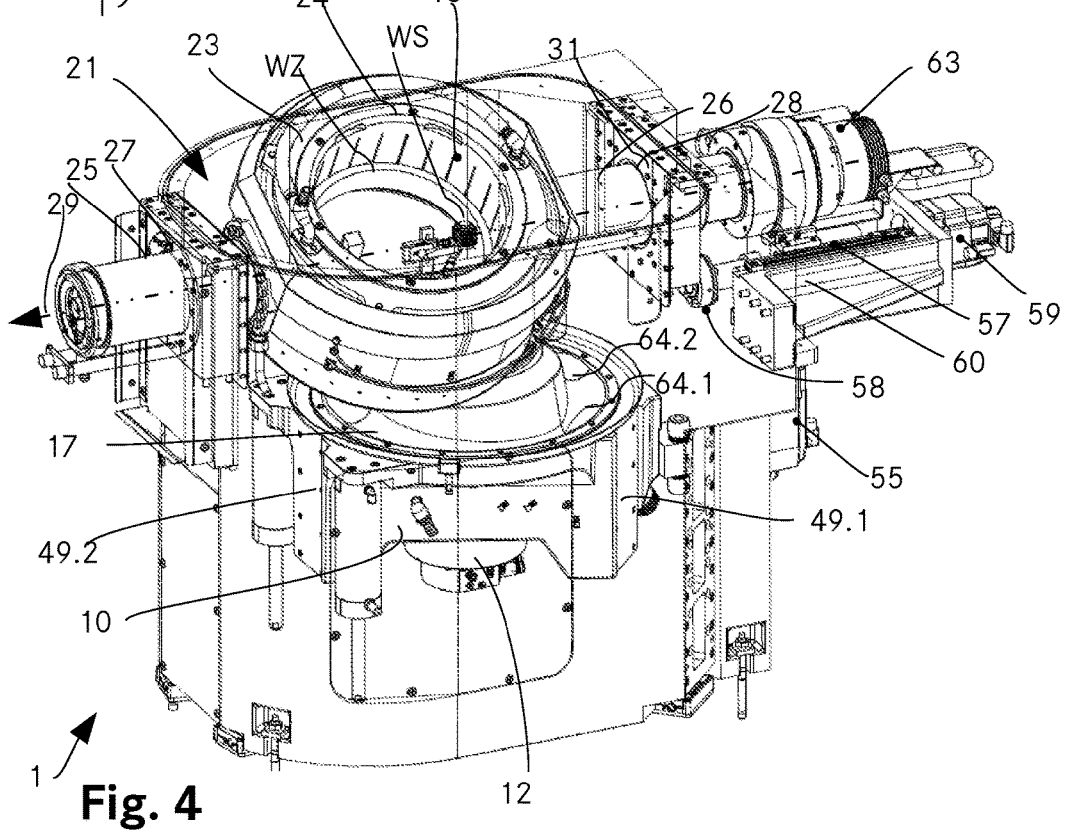
FIG. 4 shows an oblique view of the machine with the components illustrated transparently.

In horizontal section, the casing of the machine bed 3 has a rounded shape toward the front narrow side and a more rectangular shape toward the rear narrow side, which is delimited toward the rear by a straight rear wall 31 (see also FIG. 4). The longitudinal sides of the casing of the machine bed 3 are adjoined in a flush manner behind the rear wall by cuboidal rear-side cladding 32, which is part of the machine cladding.

The machine cladding also includes the service covers 33 which each terminate a rectangular cutout in the two longitudinal sides of the casing of the machine bed 3. Front cladding 34 on the front longitudinal side serves for contact protection with respect to the front steel tube 25 of the support apparatus of the honing ring carrier 23, the outer end of which is moved out of the casing of the machine bed 3 when the honing ring carrier 23 is infed in the direction of the workpiece WS, and also for protection against soiling from the outside.

The machine cladding also includes the rear-side cladding 32, which has a U-shaped casing made of sheet steel. The U is formed by two side walls that are connected via a rear wall (concealed) and is terminated downwardly by a plate made of sheet steel. The rear-side cladding 32 serves to cover or delimit machine components which are fitted outside the machine frame, in order to protect them for example from soiling or in order to ensure contact protection. These include, inter alia, the drive for the spindle slide 7 and for the drive components of the infeed and pivot axis of the honing ring carrier 23.

Arranged on the casing of the machine bed 3 and that of the rear-side cladding 32 is the machine top part 30, which comprises a plate-like drip tray 6 and the mechanical components for guiding and closing the machine hood 5. The drip tray 6 upwardly terminates the rear-side cladding 32 with a rectangular part, while it covers the walls of the machine bed 3 above the latter. At the same time, it ensures the accessibility of the working space 21 from above via a large oval opening 35.

Around the oval opening 35 there extends a U-shaped groove 45 in which the machine hood 5 engages in the closed state with the vertical lower edge of the hood periphery 37 and seals it off in an oil-tight manner by way of an encircling rubber seal fastened to the lower edge.

The machine hood 5 can be lowered over the opening by a combined sliding and pivoting mechanism 36 and thus upwardly terminate the working space 21.

FIG. 2b shows the honing machine with the machine hood 5 closed in an oblique view, while FIG. 2c shows the honing machine with the machine hood closed in a side view. The machine hood 5 is held on its top side by a carrier plate 38 that acts in a lever-like manner. This is connected on both sides, via two pivot bearings 39.1, 39.2 (39.2 not visible), to the carriages 40.1, 40.2 (40.2 not visible) of two linear guides 41.1, 41.2 arranged on the longitudinal sides of the rectangular portion of the drip tray 6. By way of the pivot bearings 39.1 and 39.2, a pivot axis 42 for the pivoting apparatus is defined, which is formed transversely to the plane of symmetry of the honing machine 1. Behind the pivot axis 42, on the side facing away from the machine hood 5, a linearly acting element 43 is connected to the carrier plate 38 at one end via a joint so as to be rotatable about the pivot axis 42 and is connected at the other end to the carriage of a central guide rail 44. The central guide rail 44 is fitted centrally between the two linear guides 41.1, 41.2. As a result of a reduction in the length of the linearly acting element 43, the machine hood 5 is raised, and as a result of said element 43 being lengthened, it is lowered. The machine hood 5 can be locked and unlocked via a handle element 46, fitted on the front side, with a catch 47 (FIG. 2b).

Figure 3:
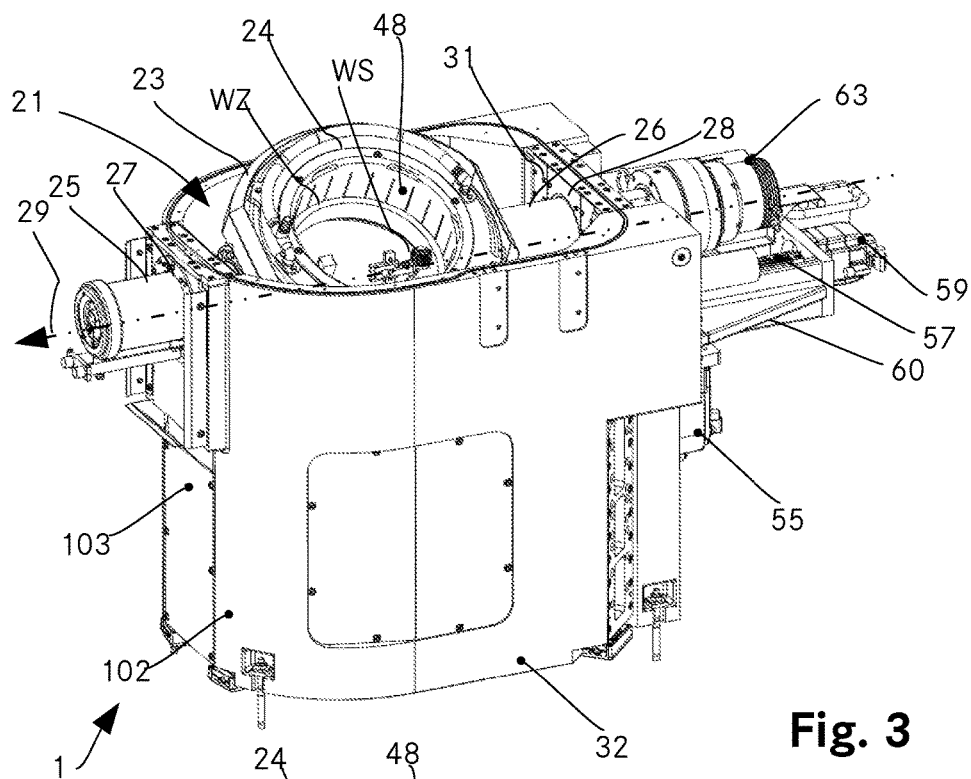
FIG. 3 shows an oblique view of the machine without front and rear cladding.
Figure 5:
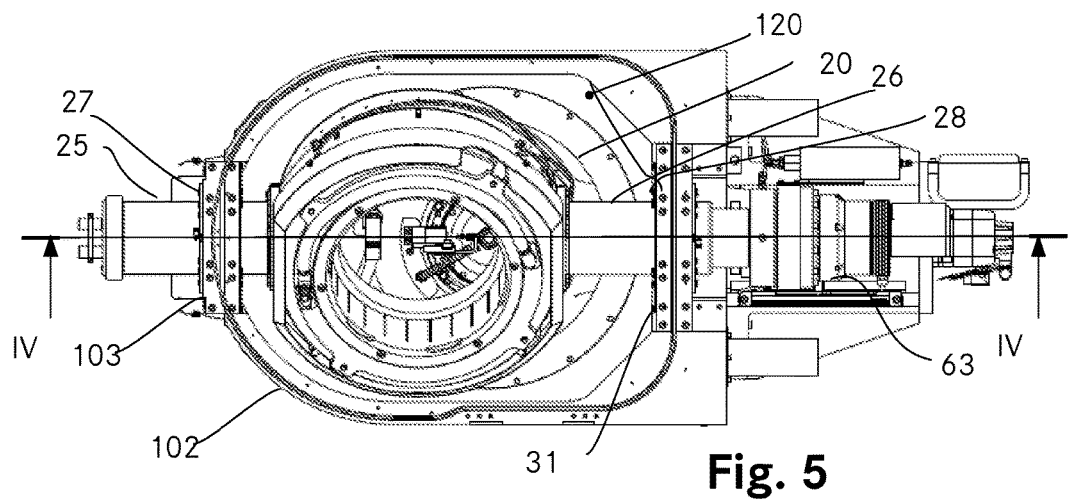
FIG. 5 shows a plan view of the machine.
Figure 6:
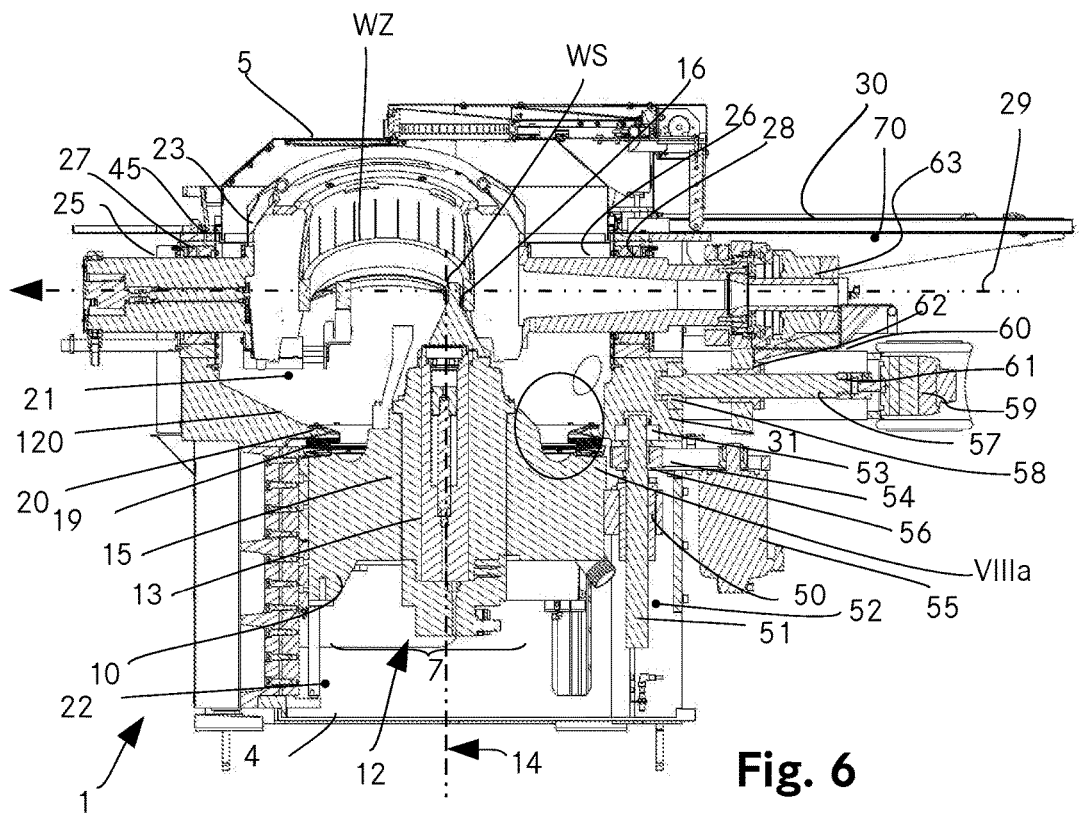
FIG. 6 shows a sectional view of the machine without front and rear-side cladding but with the machine top part.

FIGS. 3-5 show the embodiment according to the invention of the honing machine without front and rear-side cladding 34, 32, machine top part 30 and machine hood 5. In this case, FIG. 3 shows an oblique view, FIG. 4 a transparent view, and FIG. 5 a plan view of the honing machine 1. In FIG. 6, by contrast, which shows the honing machine 1 in a vertical sectional view through the plane of symmetry, the honing machine 1 is illustrated without front cladding 34 and rear-side cladding 32, but with the machine top part 30.

FIGS. 3-6 show the honing machine 1 with the machine bed 3, in which the honing ring carrier 23 is arranged in the working space 21 so as to be displaceable and at the same time pivotable along the horizontally arranged pivot and infeed axis 29. Mounted in a rotatable manner in the honing ring carrier 23 is a hollow shaft 24, which is equipped with a honing ring receptacle 48 in which the honing tool WZ in the form of an internally toothed honing ring can be clamped in place.

The casing of the machine bed 3 is formed from vertically oriented wall elements which laterally surround an interior. Toward the front, in the direction of the infeed axis 29 of the honing ring carrier, two wall elements 102 that are arcuate in horizontal section with a straight front wall element 103 located in between delimit the interior toward the front, wherein the wall elements form the shape of a slightly flattened semicircle in horizontal section. In direct continuation of the arcuate wall elements 102, three wall portions that are arranged at right angles to form a U delimit the interior in the rear region. In this case, the outer wall portions are arranged in direct tangential continuation of the arcuate wall segments 102. Fastened to the rear wall 31, the rear narrow longitudinal side of the machine bed, are the drive elements of the pivot and infeed axis of the honing ring carrier 23, and the sliding guide 28 for a steel tube 26 of the support apparatus of the honing ring carrier 23 is likewise arranged there. Arranged diametrically opposite, in the front wall element 103, is the sliding guide 27 of the other steel tube 25 of the support apparatus of the honing ring carrier 23.

In FIG. 4, the spindle carrier is illustrated with the three faces 49.1, 49.2, 49.3 (49.3 not visible, since it is concealed), which face outward and are each offset through 120°, for fastening the carriages 9.1, 9.2 (FIG. 1). Fitted in the drainage channel 17 that is concentric with the workpiece axis 14 are drain openings 64.1, 64.2. The drainage channel 17 has a gradient that drops toward the drain holes 64.1, 64.2. The honing oil that has drained through the drain holes is fed to a honing-oil treatment plant via lines which are connected to the spindle carrier 10.

In FIG. 6, the vertical longitudinal section of the honing machine 1 through the plane of symmetry is illustrated. It shows the interior, surrounded in the vertical direction by the casing of the machine bed, of the honing machine 1, said interior being subdivided into two subspaces by the folding bellows 19 and the spindle slide 7 approximately halfway up the machine bed 3: for the one part into the working space 21, which is located above the upwardly oriented external contour of the spindle slide 7 and at the same time not outside the external contour of the folding bellows 19, and for the other part into the machine space 22, which is located beneath the upwardly oriented external contour of the spindle slide 7 and outside the folding bellows 19. The machine space 22 is delimited downwardly by a base plate 4 and the working space 21 is delimited upwardly by the closed machine hood 5, which projects with its perpendicular lower edge at the hood periphery 37 (FIG. 2a) into the U-shaped groove 45 which is arranged around the opening 35 (FIG. 2a) of the drip tray 6.

In order to fasten the folding bellows 19 to the wall of the machine frame 2, or of the machine bed 3, a protrusion 120 is attached to a circumference of the casing, said protrusion dropping in a funnel-shaped manner from outside to inside and merging into an annular circular face which forms the inner flange 20 for fastening the folding bellows 19 to the machine bed. The protrusion 120 is designed in a largely solid manner in order to increase the machine rigidity. Since the inner flange 20 is arranged centrically with respect to the workpiece spindle axis 14 and not centrically with regard to the casing of the machine bed 3, but more toward the rear wall 31 of the machine bed with regard to the longitudinal axis 29 of the machine, the protrusion 120 projects less far into the interior surrounded by the casing in the region of the rear wall.

The folding bellows 19 is fastened on its lower side to the outer flange 18 (FIG. 1) of the spindle carrier 10.

The workpiece spindle 13 is fastened with its spindle housing 15 in the circular opening of the spindle carrier 10. In addition to the workpiece spindle 12 and the spindle carrier 10, the spindle slide 7 comprises three carriages 9.1, 9.2 (FIG. 1) and a fixed spindle nut 50 which is fitted laterally on the spindle carrier 10. This spindle slide 7 is drivable along the workpiece axis 14 via a ball screw 51 which interacts with the fixed spindle nut 50. For the ball screw, a vertical rectangular opening 52 is provided in the rear wall 31, beneath the plain bearing 28, said rectangular opening 52 extending downward as far as the base plate 4. Over the opening, the rear wall 31 is designed in a bulky manner and has a large wall thickness such that it can receive the ball screw 51, attached in a suspended manner, on the underside of the fixed bearing 53. Said ball screw 51 is driven via a synchronous belt 54 which acts on a pinion which is arranged between the thread of the ball screw 51 and the fixed bearing 53. The synchronous belt 54 is driven by a conventional servomotor 55 which is arranged outside the casing of the machine bed 3. It is fastened to the machine bed 3 via a fastening plate 56 fitted horizontally on the lower edge of the vertical opening 52. Since the servomotor 55 is located outside the casing, space can be saved. In addition, the servomotor 55 is more easily accessible. The spindle slide 7 makes it possible to realize movements in the direction of the workpiece axis 14. These are small pendulum movements during the machining of a workpiece WS or the dressing of the tool WZ, or of the honing ring, or larger positioning movements for traveling into a position for changing a part or changing a tool.

The honing ring carrier is mounted in the machine bed 3, so as to be rotatable and pivotable along the longitudinal axis 29, via the steel tubes 25, 26 which are fastened diametrically on the outer casing of the honing ring carrier 23 and extend outwardly on both sides through the lateral openings in the machine bed with plain bushings 27, 28. For the movement of the honing ring carrier 23 in the longitudinal direction, a ball screw 57 is arranged horizontally in the direction of the longitudinal axis, said ball screw 57 being mounted in a rotatable manner on one side via a fixed bearing 58 fitted vertically in the rear wall 31 and being driven by a conventional servomotor 59 at the end of the ball screw 57. The servomotor 59 is flange-mounted on the rear side of a cuboidal drive box 60 and connected to the ball screw 57 via a shaft coupling 61. The drive box 60 is fastened to the rear side of the rear wall 31 of the machine bed. The spindle nut 62 of the ball screw 57 is firmly connected, via a driving plate, to the housing of the pivot drive 63 of the honing ring carrier 23, the output shaft of which is in turn firmly connected to the end of the second steel tube 26. In order to prevent any twisting of the pivot drive housing 63 with respect to the machine bed 3, the pivot drive housing 63 is connected via a linear guide, the guide rail of which is fastened to the drive box 60 (not visible). The pivot drive moves with the honing ring carrier 23 during a movement along the longitudinal axis 29.

The pivot drive comprises a servomotor with a backlash-free robot transmission.

FIG. 6 also shows that the machine top part 30 with the integrated drip tray 6 comprises an angle bracing 70 which supports the drip tray on the machine bed.

In FIGS. 3-6, the workpiece spindle 15 and the honing ring receptacle 23 are in a machining position in which the folding bellows 19 is largely relieved of load.

Figures 7A, 7B:
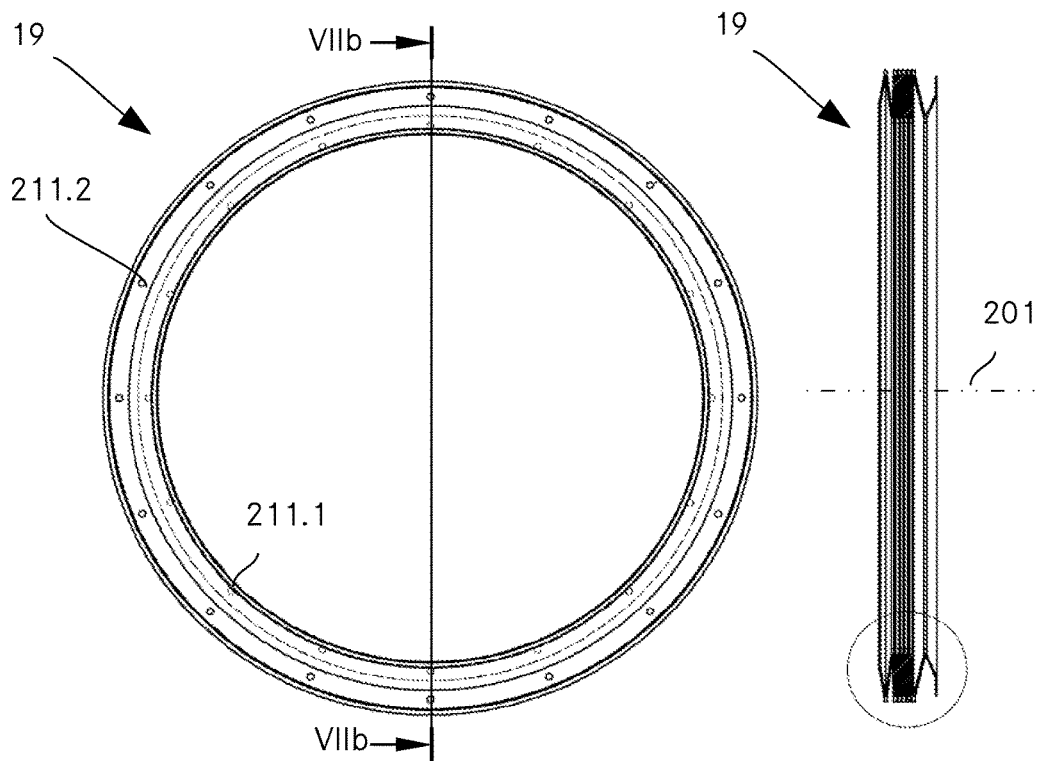
FIG. 7a shows a plan view of the folding bellows of the exemplary embodiment according to the invention.
FIG. 7b shows a sectional view of the folding bellows of the exemplary embodiment according to the invention.
Figure 7C:
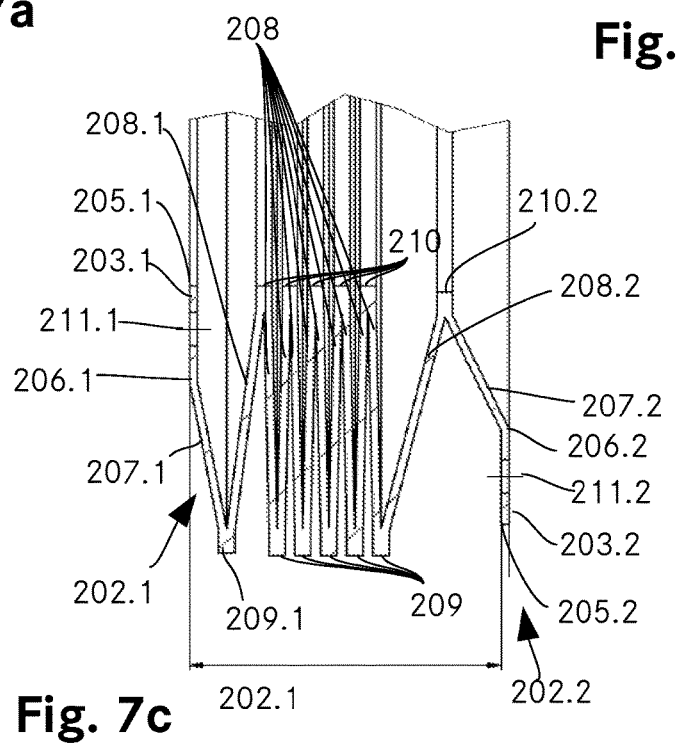
FIG. 7c shows an enlarged view of a detail of FIG. 7b.

The folding bellows 19 of the exemplary embodiment of the honing machine 1 according to the invention is illustrated in detail in the undeformed or unloaded state in FIGS. 7a, 7b and 7c. The folding bellows 19 is constructed substantially concentrically with a central axis. FIG. 7a shows a plan view in the direction of this central axis 201, FIG. 7b shows a diametric section through the folding bellows 19, and FIG. 7c shows an enlarged detail of the sectional illustration in FIG. 7b.

The central axis 201 of the folding bellows 19 in this case coincides with the workpiece spindle axis 14, or the first spindle axis of the honing machine, in the direction of which the folding bellows 19 takes up relative movements of the spindle slide with respect to the machine frame.

The folding bellows 19 is configured in a rotationally symmetrical manner with respect to a central axis 201.

The folding bellows is produced from an elastomer. For honing machines, nitrile butadiene rubber (NBR), a synthetic rubber which has high resistance to mineral oils and at the same time is elastic and exhibits compression set resistance, is particularly suitable. It is thus particularly resistant to machining liquids which are used for gear honing, for example Castrol Honilo 980.

At a first outer end, the folding bellows 19 comprises a first flange segment 202.1, which is provided for connecting the folding bellows 19 to the outer flange 18 of the spindle slide 7. At the second outer end, it has a second flange segment 202.2, which serves to connect the folding bellows 19 to the inner flange 20 of the machine bed 3.

Between the two flange segments 202.1 and 202.2, identical flat annular flank segments 208, 208.1, 208.2 form the flanks of the folds of the folding bellows 19. Two adjacent flank segments 208, 208.1, 208.2 are alternately connected together in an encircling manner in the region of their outer periphery and inner periphery, preferably by welding. However, other forms of connection are possible, for example adhesive bonding. The encircling connecting points in this case form the outer folds 209 and the inner folds 210 of the folding bellows 19. In the folds, the wall thickness of the folding bellows is somewhat greater, since the wall thickness there is produced from the wall thickness of two adjacent flank segments. It is also possible, however, to produce the folding bellows in one piece, for example by injection molding.

The first flange segment 202.1 has a first flange region 203.1 in the form of an annular disk, the inside diameter of which is determined by an inner periphery 205.1 of the first flange segment 202.1 and the outside diameter of which is determined by the first transition 206.1 centrically surrounding the central axis 201, the first flange segment 202.1 transitioning from the first flange region 203.1 in the form of an annular disk into a first conical portion 207.1 at said first transition 206.1. Provided in the first flange region 203.1 is a first hole circle 211.1 for fastening the folding bellows to the outer flange 18 of the spindle slide. The first conical portion 207.1 extends from the first transition 206.1 to the outer periphery of the first flange segment 202.1. In this case, the internal angle between the flange region in the form of an annular disk and the conical portion is approximately 80°.

The first flank segment 208.1 is connected with its outer periphery to the outer periphery of the first flange segment 202.1 in a first outer fold 209.1. The two segments enclose an internal angle of about 19° at this connecting point. There then follow, in the exemplary embodiment, a further ten flank segments 208, 208.2, which are connected alternately in the region of their adjacent inner peripheries in each case in an inner fold 210, 210.2 or in the region of their adjacent outer peripheries in each case in an outer fold 209. In cross section, the flange segments connected in this way form a zigzag shape, which is also apparent in FIG. 7c. In the exemplary embodiment, the internal angle between the first flank segment 208.1 and the adjacent flank segment 208 is about 9°. The internal angles in the following seven connecting points or folds 209, 210, 210.2 are smaller and only about 2°. The flank gradient of the second outer flank segment 208.2, which is connected to a second flange segment 202.2 in the last inner fold 210.2, is flatter. It is connected to the adjacent flank segment 208 in an outer fold tip 209 and encloses an angle of about 16° with said adjacent flank segment 208. The last outer flank segment 208.2 is connected to the second flange segment in a last inner fold 210.2. On this connecting line, the adjacent segments enclose an internal angle of about 30°, wherein the flange segment with the second conical portion 207.2 of the second flange segment adjoins the last flank segment 208.2. The second conical portion 207.2 of the second flange segment 202.2 transitions into a second flange portion 203.2 (in the form of an annular disk) at a second transition 206.2, the inside diameter of said second flange portion 203.2 being determined by the transition diameter and the outside diameter thereof being determined by an outer periphery 205.2 of the second flange portion 202.2.

In this exemplary embodiment, the folding bellows comprises a total of ten individual segments. Depending on the application, the folding bellows can also have more or fewer individual segments, however, depending on the travel it is intended to be designed for. The opening of the folding bellows is determined by the inside diameter of the inner fold 210, 210.2 and by the diameter of the inner periphery 205.1 of the first flange segment. The latter diameter, however, is selected such that it corresponds to the inside diameter of the inner fold 210. Only the diameter of the last inner fold 210.2 is greater by just under two wall thicknesses. The outside diameters of the outer folds are the same, apart from the outside diameter of the first outer fold 209.1. This is smaller than the outside diameter of the remaining outer folds 209 by a fraction of the wall thickness. These differences in diameter between the individual folds compensate for the resultant changes in diameter between the individual segments, which result upon extension and contraction of the folding bellows, since in particular the gradient of the outer flanks changes less in the event of a change in length of the folding bellows. Provided in the second flange region 203.2 is a second hole circle 211.2 for fastening the folding bellows to the inner flange 20 of the machine bed.

In the exemplary embodiment, the folding bellows has, at a wall thickness of about 1.5 mm, an opening diameter of about 562 mm in the unloaded state, while the outside diameter is about 675 mm. The length of the folding bellows in this state is about 64 mm. Proceeding therefrom, the working range extends by +/−2 mm. The maximum extension of the folding bellows is 228 mm, i.e., with regard to the unloaded state, 164 mm. The compression is, by contrast, 47 mm, or 17 mm with respect to the undeformed state.

FIGS. 8a and 8b show an enlarged detail of the sectional drawing in FIG. 6. FIG. 8a shows the folding bellows in the working position in the virtually unloaded state, while FIG. 8b shows the folding bellows in the state extended to the maximum permissible extent.

The disk-shaped first flange region 203.1 of the first flange segment 202.1 serves to connect the folding bellows 19 to the outer flange 18 of the spindle slide 10. For fastening, the flange region 203.1 is clamped between a hollow-cylindrical clamping disk 220.1 and the outer flange 18 of the spindle carrier 10. For clamping, a screw connection is provided between the hollow-cylindrical clamping disk 220.1 and the outer flange 18 of the spindle carrier 10, for which purpose a first hole circle 211.1 with 16 holes and a hole diameter of 7 mm for M6 screws is provided in the first flange region 203.1. In a corresponding manner, the disk-shaped second flange region 203.2 of the second flange segment 202.2 serves to fasten the folding bellows 19 to the inner flange 20 of the machine bed 3. Provided in this flange face is a second hole circle 211.2 with 16 holes with a hole diameter of about 7 mm for M6 screws, in order for it to be possible to clamp the second flange region 203.2 in place between a likewise hollow-cylindrical clamping disk 220.2 and the inner flange 20 of the machine bed 3 via a screw connection. Above the second hollow-cylindrical clamping disk 220.2, a further annular drip tray 221 is fastened with the screws of the second hole circle 211.2, the skirt 222 of which largely screens the folds of the folding bellows from honing oil in the working position. As a result of the clamping between the clamping disks 220.1, 220.2 and flanges 18, 20, sealing off is effected between the spindle carrier 10 and the folding bellows 19, or between the machine bed 3 and the folding bellows 19.

In summary, it should be noted that, by way of the invention, a gear processing machine is created which, while having a simple and space-saving structure, is very easy to service and allows cost-effective maintenance.

The invention claimed is:

1. A gear processing machine comprising:
   a) a machine frame,
   b) a spindle slide having a first spindle, which comprises a first spindle housing and a first spindle shaft, wherein the first spindle shaft is arranged in the first spindle housing so as to be rotatable about a first spindle axis and has a free end for receiving a workpiece or a tool,
   c) a second spindle having a second spindle housing and a second spindle shaft, wherein the second spindle shaft for receiving a tool or workpiece is arranged in the second spindle housing so as to be rotatable about a second spindle axis,
   d) wherein at least one wall of the machine frame forms a part of a shell of a closable working space in which the workpiece is able to be machined and which is configured to be closed off in order to prevent any removed material, machining liquid and/or machining mist from escaping from the working space into other machine regions or to the outside, e) and the spindle slide is arranged on the machine frame so as to be displaceable in the direction of the first spindle axis, f) and the closable working space encloses the free end of the first spindle shaft and at least partially encloses the second spindle shaft, characterized in that g) the gear processing machine comprises a bellows which is firmly connected to the spindle slide on a first side and which is firmly connected to the at least one wall of the machine frame on a second side, h) wherein the bellows delimits the closable working space on at least one location such that a part of the spindle slide is located permanently outside the working space, and i) wherein the bellows is capable, by expanding or contracting, of taking up any relative movement in the direction of the first spindle axis between the spindle slide and the machine frame.

2. The gear processing machine as claimed in claim 1, wherein the bellows is a folding bellows.

3. The gear processing machine as claimed in claim 1, wherein the bellows has a first opening on the first side and a second opening on the second side and a circumferentially closed lateral surface in between, and is connected to the spindle slide in a region of a contour of the first opening and to at least one wall of the machine frame in a region of a contour of the second opening, wherein the two contours each surround the first spindle axis.

4. The gear processing machine as claimed in claim 1, in which the first spindle axis is oriented substantially vertically and the free end of the first spindle shaft is directed upward.

5. The gear processing machine as claimed in claim 1, wherein the working space is closable with respect to the escape of machining liquid or machining mist.

6. The gear processing machine as claimed in claim 1, in which the second spindle shaft is configured as a hollow shaft for receiving an annular tool or an annular workpiece.

7. The gear processing machine as claimed in clan 20, wherein the gear processing machine is a gear honing machine.

8. The gear processing machine as claimed in claim 1, wherein the second spindle housing is mounted on the machine frame in a manner perpendicular to the first and to the second spindle axis so as to be pivotable about a pivot axis.

9. The gear processing machine as claimed in claim 8, wherein the second spindle housing is additionally mounted on the machine frame so as to be displaceable along, a linear axis which coincides with the pivot axis.

10. The gear processing machine as claimed in claim 1, in which the closable working space entirely encloses the second spindle shaft.

11. The gear processing machine as claimed in claim 3, wherein the lateral surface of the bellows has a round cross section.

12. The gear processing machine as claimed in claim 1, wherein the bellows is produced from an elastomer.

13. The gear processing machine as claimed in claim 12, wherein the elastomer is rubber.

14. The gear processing machine as claimed in claim 3, wherein the space surrounded by the bellows belongs to the working space.

15. The gear processing machine as claimed in claim 3, wherein the spindle slide has an annular flange which is connected to the bellows in via a circumference in the region of the contour of the first opening.

16. The gear processing machine as claimed in claim 15, wherein the flange defines an annular well with at least one drain opening, through which the machining liquid and the chips run out of the working space.

17. The gear processing machine as claimed in claim 1, in which the machine frame is configured such that the working space is closable at the top by a cover.

18. The gear processing machine as claimed in claim 1, characterized in that the spindle slide is coupled to a ball screw, wherein the ball screw is supported on the machine frame.

19. The gear processing machine as claimed in claim 1, wherein the bellows is designed such that it is capable of permanently taking up pendulum stroke movements in the range of up to about +/−5 mm, about a working position during machining, wherein the working position is at most 50 mm away from a neutral position of the bellows; wherein in order to change a workpiece, the bellows are extended into a changing position, the changing position being between 0-200 mm from the neutral position.

20. The gear processing machine as claimed in claim 1, in which the first and the second spindle are motor spindles.

21. The gear processing machine as claimed in claim 1, wherein the gear processing machine is a gear hard finishing machine.

22. The gear processing machine as claimed in claim 8, wherein the second spindle housing is mounted on the machine frame at two diametrically opposite bearing locations.

* * * * *